Aug. 31, 1943.                L. D. COBB                2,328,327
                           LUBRICATOR DEVICE
                         Filed April 23, 1941
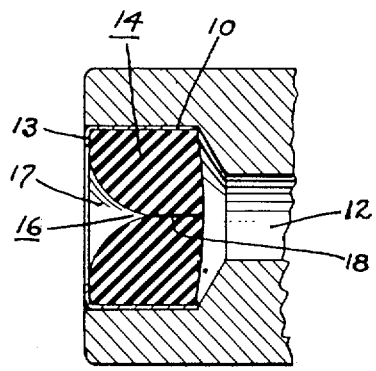
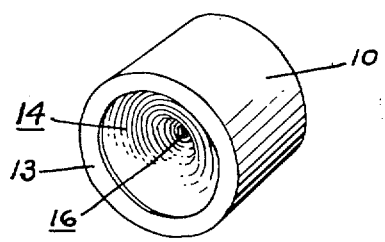
Fig. 1                                    Fig. 2
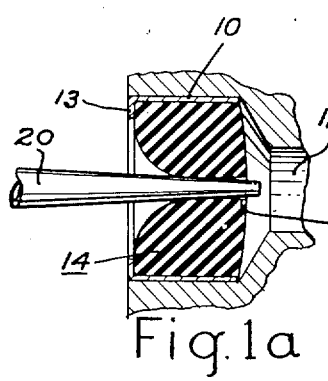
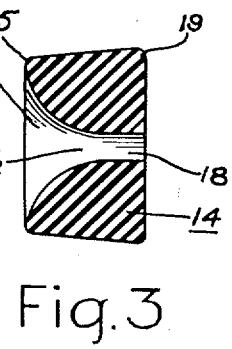
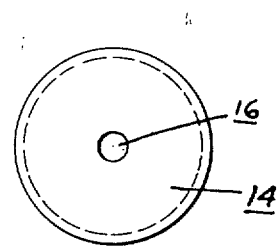
Fig. 1a        Fig. 3              Fig. 4
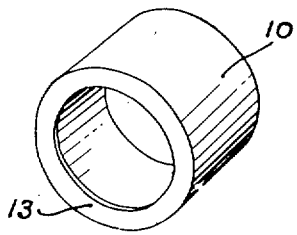
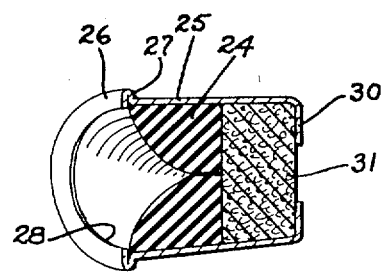
Fig. 5                             Fig. 6
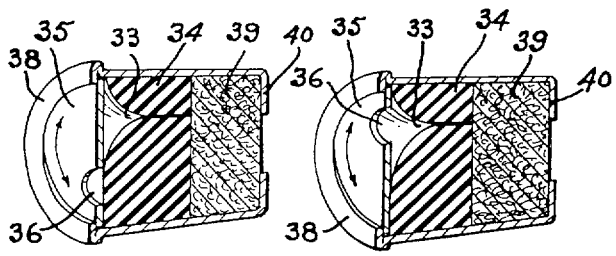
Fig. 7       Fig. 8
INVENTOR;
LELAND D. COBB.
BY Romeyn A. Spare
HIS ATTORNEY.

Patented Aug. 31, 1943

2,328,327

UNITED STATES PATENT OFFICE 2,328,327

LUBRICATOR DEVICE

Leland D. Cobb, Forestville, Conn., assignor to General Motors Corporation, Detroit, Mich., a corporation of Delaware Application April 23, 1941, Serial No. 389,845

14 Claims. (Cl. 184—105)

This invention relates to lubricator devices, and particularly to a self-closing non-leaking lubricator fitting.

An object is to provide a lubricator device through which lubricant may be easily fed from the nozzle of a pressure lubricator and which will automatically close and prevent lubricant leakage therethrough when the nozzle is removed therefrom. Another object is to provide a lubricator fitting which sealingly and deformably receives the nozzle of a lubricant supply device and which wipes the nozzle free of lubricant and closes drip-free of lubricant as the lubricant supply device is withdrawn therefrom.

To these ends and also to improve generally upon devices of the character indicated, the invention consists in the various matters hereinafter described and claimed. In its broader aspects the invention is not necessarily limited to the specific constructions selected for illustrative purpose in the accompanying drawing in which Figure 1 is a diametrical section showing my lubricator fitting closing the end of a lubricant passage;

Figure 1A is a view similar to Figure 1 but showing the nozzle of a pressure lubricator inserted in lubricating position;

Figure 2 is a perspective view of my invention;

Figure 3 is a diametrical section through my lubricator bushing;

Figure 4 is an end elevation of the bushing;

Figure 5 is a perspective view of the retaining shell for the bushing;

Figure 6 is a perspective view in diametrical section of another embodiment of my invention; and Figures 7 and 8 are perspective view in diametrical section through another embodiment of my invention.

Heretofore, one inherent difficulty of prior lubricator fittings has been that as the lubricant supply device, such as an oil can or grease gun, was withdrawn from the fitting, a coating of lubricant was deposited on the outside of the fitting, and this coating provided a trap to which dust, dirt, lint and other deleterious matter adhered. When the lubricant supply device was again placed on the fitting, this collected coating of dirt not only interfered with the correct operation of the lubricator fitting, but some of this dirt was often forced into bearings supplied from this fitting. Also, these prior fittings dripped lubricant onto the floor and onto adjacent machine parts causing further objectionable collections of dirt. These prior leaking lubricator fittings have been particularly troublesome on and about textile machinery where there is much lint present. The present invention provides a self-wiping, self-closing, lubricator fitting wherein the fitting actually cleans the nozzle of the oil can or grease gun drip-free as it is withdrawn from the fitting and sealingly closes so that there is no leakage of lubricant over the outside of the fitting.

In the embodiment of my invention illustrated in Figures 1 to 5, I have provided a unit-handling lubricator fitting having a rigid annular holder or open ended tubular shell 10 of fixed diameter and conveniently formed from suitable material such as sheet metal pressed to shape, and arranged to be peripherally and sealingly seated with a press fit in a passage such as the counterbored outer end of a suitable lubricant passage 12 in a rigid housing. The outer end of the shell 10 has a radially inwardly turned annular flange or rim 13, and a frusto-conical yieldable bushing 14 composed of an inherently resilient, rubber-like material such as "neoprene" is radially and deformably compressed into peripherally seated engagement within the shell 10 and with its outer and smaller end 15 located against the rim 13. A bore 16 which extends through the bushing 14, has a bell-mouthed outer end 17 that converges at its inner end to form a narrow throat 18 that lies within the enlarged inner end 19 of the bushing 14. This enlarged inner end 19 exceeds the internal diameter of the annular shell 10 within which it is received sufficiently to normally deformably and resiliently compress the bushing wall surrounding the throat 18 so that the passage through this throat is reduced from its initial size shown in Figure 3 to the closed condition shown in Figure 1. Due to the inherent resiliency and free deformability of the bushing 14, the throat 18 will tend to remain closed so that lubricant cannot leak from the passage 12 out of the bushing 14.

When it is desired to feed lubricant into the passage 12, the tubular nozzle 20 on a lubricator, such as an oil can or a grease gun containing suitable lubricant, may be seated either against the reduced inner end of the bell-mouth 17, or preferably pressed into and through the normally closed resilient throat 18 as shown in Figure 1A. In the event that the nozzle is only pressed against the inner end of the bell-mouth 17, the inherently resilient deformability of the rubber-like material of the bushing 14 sealingly engages against the tubular end of the nozzle and lubricant under pressure from this nozzle forces passage through the throat 18. As soon as the feed of lubricant is stopped, the bushing 14 will automatically return to its closed position of Figure 1. When the nozzle 20 is pressed through the throat in the preferred manner as shown in Figure 1A, the side walls of the throat 18 will resiliently embrace the nozzle and prevent leakage between the nozzle and the bushing 14. Upon withdrawal of this nozzle 20, the side walls of the throat will wipe the exterior of the nozzle free of lubricant and will progressively close to the sealed position of Figure 1 as the inner end of the nozzle is withdrawn towards and out of the bell-mouth. Hence, my bushing automatically seals itself against leakage and also provides a wiping means which prevents the deposit of lubricant on the outside of my lubricator fitting. With this construction, the bell-mouth remains free of lubricant.

Figure 6 shows another embodiment of my invention wherein a bushing 24 similar to my bushing 14 is peripherally and compressively seated within an outer shell 25 that is adapted to be pressed into a suitable lubricant passage. This outer shell has an annular rim 26 folded over upon itself to provide at its outer end a locating shoulder 27 for engagement against the end of the lubricant passage and a radially inwardly extending annular shoulder 28 for locating the outer end of the bushing 24. The inner end of the shell 25 has a radially inwardly extending annular flange 30, and a wick 31 is located between this flange and the adjacent end of the bushing 24. The wick serves as a filter for the lubricant and also provides a slow feed for lubricant into the lubricant passage.

My embodiment of Figures 7 and 8 is generally similar to the showing of Figure 6 except that the bell-mouthed passage 33 through a bushing 34, corresponding to the bushing 24, is offset radially of the geometrical axis of the bushing, and a rotatable cover plate 35 provided with a lubricant receiving aperture 36 is peripherally journalled in the shell and frictionally gripped between an annular shell rim 38 and the bushing 34. The aperture 36 is eccentrically located in a corresponding manner to the bell-mouthed passage and may be revolved into or out of registry with this passage by means of a nozzle, as 20, of a suitable lubricator and which may extend therethrough into seated engagement with this bell mouthed passage in the same manner as indicated in Figure 1A. A wick 39 is located between a shell flange 40 and the bushing 34. This embodiment of Figures 7 and 8 is particulraly useful in locations where dust and dirt may be thrown against my lubricator fitting. When the cover plate 35 is turned to the position of Figure 7, the entrance to the bell-mouth is closed and the yieldable engagement of the bushing 34 against the inner side of this cover plate holds the cover plate in its preset position.

In my various embodiments, I do not wish to be limited to the illustrated frusto-conical form of my deformably resilient bushing since it will be evident that this bushing might be of uniform external diameter or other suitable contour and still be compressively mounted so that the passage therethrough normally tended to remain closed. Also, it will be appreciated that the passage through the bushing may initially constitute only a pierced portion, and the insertion of the nozzle 20 would distend this pierced portion to form a suitable lubricant passage which of itself would close whenever the nozzle were withdrawn.

I claim:

1. In a device of the character indicated, a rigid open ended tubular shell of fixed diameter and arranged to be press fitted in a lubricant passage in a housing, a frusto-conical bushing compressively mounted in unit-handling relation with said shell, said bushing being deformably resilient and having a bell-mouthed through bore provided with a narrow throat entering the larger end of the bushing, and the enlarged end of said bushing being so compressed by the shell that the bushing tends to resiliently close said throat.

2. In a device of the character indicated, a rigid tubular metal shell of fixed diameter provided with open ends and arranged to be press fitted in a housing bore, an inwardly turned rim on one end of said shell, a frusto-conical bushing compressively received in said shell with the smaller end of said bushing against said rim, said bushing being resiliently deformable and having a bore therethrough which has a bell-mouth at the smaller end of the bushing and which has a narrow throat at the larger end of said bushing, and the enlarged end of said bushing having an initial diameter sufficiently in excess of that portion of the shell in which it is received so that the bushing tends to resiliently maintain said throat closed.

3. In a device of the character indicated, an annular holder, a bushing compressively mounted in said holder and having a pierced portion that is resiliently expansible to provide a lubricant passage therethrough, and a wick mounted in the holder at one end of said passage.

4. A unit-handling lubricator fitting comprising an annular shell, a rim on one end of said shell, an inwardly extending flange on the other end of said shell, a deformable rubber-like bushing compressed in the shell adjacent to said rim, said bushing having a pierced portion that is resiliently expansible to form a lubricant passage therethrough, and a wick mounted in said shell between said flange and the bushing.

5. In a device of the character indicated, an annular shell, a rim on one end of said shell having an external shoulder and an internal shoulder, an inwardly directed flange on the other end of the shell, a radially resilient bushing compressed in said shell and abutting against said internal shoulder, said bushing having a through bore which tends to remain yieldably closed by the compression of the bushing in said shell and a wick mounted in the shell between the bushing and said flange.

6. In a device of the character indicated, a bushing, said bushing being resiliently deformable and having a portion longitudinally pierced therethrough, said pierced portion being expansible to provide a lubricant passage through the bushing, an annular holder compressively receiving the bushing, and an apertured closure member mounted in the holder for movement in and out of covering relation with said pierced portion.

7. In a device of the character indicated, a bushing, said bushing being resiliently deformable and having a through bore located eccentrically to the geometric axis of the bushing, an annular holder for compressively receiving said bushing and tending to resiliently deform the bushing to yieldably close said bore, an annular rim at one end of said holder, and a rotatable eccentrically apertured member between said rim and the bushing, said aperture being movable into and out of covering relation with said bore.

8. In a device of the character indicated, a resiliently deformable bushing having a bore therethrough which is offset from the geometrical axis of the bushing, an annular holder into which the bushing is radially compressed to normally and yieldingly reduce said bore to a closed condition, and a cover plate rotatably supported in the holder at one end of said bushing, said cover plate having an eccentrically located aperture which may be moved into and out of register with said bore.

9. A unit-handling lubricator fitting comprising an annular shell, a rim at one end of the shell, an inwardly directed flange at the other end of said shell, said rim having an annular inwardly extending shoulder and an annular outwardly extending shoulder, a frusto-conical bushing compressed in said shell adjacent said rim and having an eccentrically disposed through bore, said bushing being inherently resilient and so compressed that the bore tends to remain yieldably closed, a wick between the bushing and said flange, and a rotatable cover plate between the inwardly extending shoulder and said bushing, said cover plate having an eccentrically disposed aperture movable into and out of register with said bushing bore.

10. A lubricating device comprising a rigid tubular metal shell having a fixed diameter and arranged to press fit within a lubricant passage in a housing, an inherently resilient frusto-conical bushing compressed into unit-handling relation with said shell and having a bore therethrough, and said shell deformably compressing the bushing radially inwardly to cause said bore to normally reduce a closed condition.

11. A unit-handling lubricator fitting comprising a rigid annular metal shell having a fixed diameter and arranged to press fit within a lubricant passage in a housing, a radially inwardly directed flange on one end of said shell, an inherently resilient bushing compressively received by said shell and located against said flange, and said bushing having a passage therethrough which is normally reduced to a closed condition by the compression of said bushing.

12. A lubricating device comprising a rigid open ended tubular shell of fixed diameter and arranged to press fit within a housing bore, an inherently resilient bushing compressively received throughout its length within said shell, and said bushing being longitudinally pierced therethrough between the open ends of said shell.

13. A unit-handling lubricating device comprising a rigid open ended tubular shell of fixed diameter and arranged to be press fitted in a housing bore, an inherently resilient bushing compressively received by said shell, and said bushing being initially provided with a through bore which is normally urged to a closed condition when said shell compresses the bushing.

14. A lubricating device comprising a rigid housing having a lubricant passage, a rigid tubular metal shell of fixed diameter having open ends and press fitted within said lubricant passage, an inherently resilient bushing compressively received in unit-handling relation within said shell, said bushing being provided with a through bore extending between the open ends of said shell, and said shell deforming the bushing resiliently and radially inwardly to normally reduce said bore to a closed condition.

LELAND D. COBB.

CERTIFICATE OF CORRECTION.

Patent No. 2,328,327.  August 31, 1943.

LELAND D. COBB.

It is hereby certified that error appears in the printed specification of the above numbered patent requiring correction as follows: Page 2, first column, line 48, for "registry" read --register--; and second column, line 65, claim 6, for "in" read --into--; page 3, first column, line 39, claim 10, after the word "reduce" insert --to--; and that the said Letters Patent should be read with this correction therein that the same may conform to the record of the case in the Patent Office.

Signed and sealed this 26th day of October, A. D. 1943.

(Seal)

Henry Van Arsdale,
Acting Commissioner of Patents.